United States Patent [19]

Steinmann et al.

[11] Patent Number: 4,514,035
[45] Date of Patent: Apr. 30, 1985

[54] CABLE WITH AN OUTER JACKET OF GNAW RESISTANT MATERIAL

[75] Inventors: Peter Steinmann; Norbert Sutor, both of Deisenhofen, Fed. Rep. of Germany

[73] Assignee: Siemens Aktiengesellschaft, Berlin and Munich, Fed. Rep. of Germany

[21] Appl. No.: 409,713

[22] Filed: Aug. 19, 1982

[30] Foreign Application Priority Data

Oct. 7, 1981 [DE] Fed. Rep. of Germany ....... 3139897

[51] Int. Cl.³ ................................................ G02B 5/16
[52] U.S. Cl. ............................. 350/96.23; 350/96.20; 174/120 R; 174/136
[58] Field of Search ................. 350/96.23; 174/120 R, 174/136; 405/154, 155, 180

[56] References Cited

U.S. PATENT DOCUMENTS

| 3,772,451 | 11/1973 | Canavan et al. | 174/136 X |
| 4,110,991 | 9/1978 | Torkuhl | 405/155 X |
| 4,148,560 | 4/1979 | Margolis | 350/96.23 |
| 4,309,072 | 1/1982 | Tweeddale | 350/96.23 |

FOREIGN PATENT DOCUMENTS

| 1415849 | 10/1968 | Fed. Rep. of Germany | 174/136 |
| 1640597 | 12/1970 | Fed. Rep. of Germany | 174/136 |

*Primary Examiner*—William L. Sikes
*Assistant Examiner*—Akm E. Ullah
*Attorney, Agent, or Firm*—Hill, Van Santen, Steadman & Simpson

[57] ABSTRACT

A cable, which is resistant to gnawing animals, includes a cable jacket surrounding cable parts such as optical waveguides and having an outer layer or jacket of a gnaw resistant material which is applied in a soft state either prior to or during installing of the cable and is then hardened to a solid state after installation of the cable.

16 Claims, 5 Drawing Figures

CABLE WITH AN OUTER JACKET OF GNAW RESISTANT MATERIAL

BACKGROUND OF THE INVENTION

The present invention is directed to a cable having a cable jacket provided with a layer of resistant material for protection against animal gnawing.

A cable, which is protected against animal gnawing, is known and an example is disclosed in German Patentschrift No. 14 15 849. In the disclosure of this German patent, a hard, inorganic material is applied to the outer surface of a cable jacket. This material for example consisting of quartz or other silicates, metal or metal carbides in the form of grains or scales of a size of at least 0.2 mm. According to one sample embodiment, the application of the hard, inorganic protective layer can occur with a jacket press whose mouthpiece is charged with the hard material that is to be applied. The hard material can be supplied dry or with a bonding agent which hardens later. A difficulty that occurs is that the hard material applied in such a manner which has solidified before the cable is installed or laid leads to a cable which is difficult to manipulate during both transporting of the cable and during the installing operation. Moreover, the danger exists that the hard material, which according to its object of course consists of relatively hard and brittle materials, is damaged during the installing process and thus open locations will occur which are no longer protected against animal gnawing.

SUMMARY OF THE INVENTION

The present invention is directed to providing a cable which is protected against animal gnawing and which cable is not difficult to transport or manipulate during a cable installing or laying operation. However, after the laying operation, the cable has a particularly high degree of protection against gnawing animals such as rodents.

This object is achieved by a cable comprising a cable jacket surrounding parts of the cable and means provided on the cable jacket to prevent animal gnawing including a layer of resistant hardenable material, said material only hardening after installation due to treatment with a hardening agent immediately before or during the installation of the cable. The inventive cable is thus surrounded with a hardenable material so that the elasticity of the cable and its flexibility for a laying operation corresponds to that of an unprotective cable. The addition of the hardening agent occurs within the framework of the laying or installing operation so that the hardening of the resistant material only concurs in the installed state when a particular flexibility of the cable is no longer required.

Since, however, the hardenable material is usually not yet sufficiently solid, a protective sleeve is provided according to one embodiment of the invention and accepts both the hardenable material as well as the cable. The sleeve or sheath guarantees that no hardenable material is lost up to or during the installing process.

The protective sleeve expediently consists of a hose surrounding the cable with a correspondingly large spacing so that the space between the hose and the cable jacket can be filled with the layer of hardenable material. In order to guarantee that the cable is surrounded at all sides by the layer of resistant material to a sufficient wall thickness, corresponding spacing pieces can be provided for example in the form of a spacing helix applied to the cable jacket or in the form of spacing pieces or the like.

A preferred embodiment of the invention utilizes concrete as the hardening material, which is only released for setting within the framework of the installing operation. Another embodiment of the hardening material consists in a mixture of fiberglass pieces and synthetic resins for example, epoxy resins or polyester resins. The glass fibers provide the protection against animal gnawing.

The invention also relates to a method for producing the cable in which a layer of material resistant to animal gnawing is applied to the cable jacket. This method is characterized by the steps of supplying a cable having a cable jacket surrounding the cable part, applying a layer of hardenable material while in a soft state to surround the cable jacket, installing the cable and hardening the material into a solid state after installation of the cable.

The invention also is directed to a device for implementing the installing method which is characterized in providing a cable plow for cable laying machine, providing an injection molding die in the cable plow for application of a layer of hardenable substance on to a cable jacket as a cable is passed through the die and the cable plow so that a continous coating of the cable occurs during the laying of the cable.

A BRIEF DESCRIPTION OF THE DRAWINGS

DESCRIPTION OF THE PREFERRED EMBODIMENTS

Figure 1:
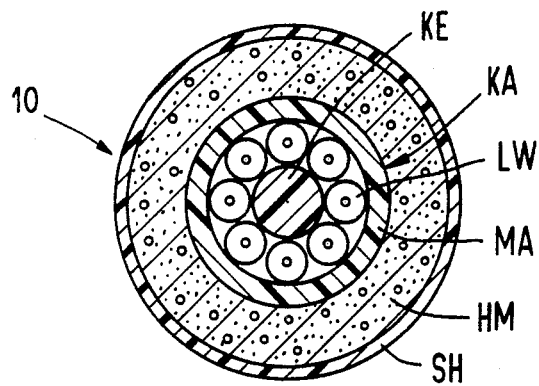
FIG. 1 is a cross-sectional view through a cable constructed in accordance with the present invention.

The principals of the present invention are particularly useful in a cable generally indicated at 10 in FIG. 1. The cable 10 contains an inner cable KA, which has a tensile or reinforcing core KE and a plurality of light waveguide elements LW which surround the core KE. A total bundle of the core KE and elements LW is surrounded by a cable jacket MA. It should be noted that each of the light waveguide elements LW can be one or more optical waveguides in their own protective cover or jacket. The cable jacket MA consists for example of a synthetic plastic, which has been extruded on to the bundle of the reinforcing part or core KE and waveguide parts or elements LW. Instead of a light waveguide cable, normal electrical cables can also be protected by the present invention. This protection however is particularly important given light waveguide cables because the thin fiberlike light waveguides cannot offer any resistance whatsoever to gnawing or chewing by animals. In addition, the employment of metallic parts, for example, plates or metal covers for the protection against gnawing animals is usually not desirable in the case of light waveguide or optical cables because a particular property of the optical transmission lines which property is their complete freedom of metal, would be lost.

The inner cable KA of cable 10 is provided with an outer sheath SH which is a protective sleeve or hose and has a diameter which is selected to be considerably larger than the diameter of the cable jacket MA. The protective sheath serves to hold a layer of hardenable material HM which has been applied between the cable jacket and the inner surface of the protective sheath SH. When a hardening agent has been added to the layer during a hardening step, the layer HM of hardenable material will become hard or solid. A mixture of cement and sand can be utilized as the hardenable material HM and this mixture under certain conditions is preferably applied as a dry mixture immediately after the actual cable manufacturer has been completed. In other words, the dry mixture is added after the jacket MA has been extruded on to the bundle of cable parts formed by the core KE and the light waveguide elements LW. This powdery hardenable material HM hardly interferes with the flexibility of the cable and thus makes transport and the laying or installing operation possible within the framework of standard methods. The protective sheath SH expediently consists of a flexible and relative thin material, for example, a synthetic film, which is shaped into a tubular hose and which is closed for example by means of bonding after it has been wrapped on to the layer of powdery material.

Figure 2:
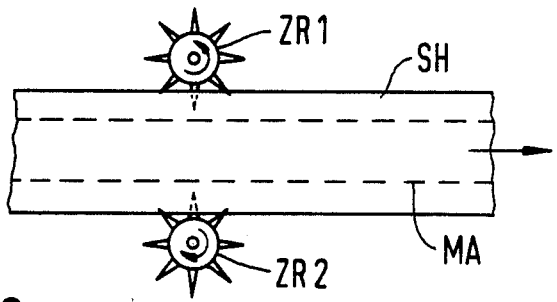
FIG. 2 is a schematic illustration of an auxiliary device for perforating the protective cover of the cable illustrated in FIG. 1.

In order to avoid a loss of the powdery hardenable material MH, the protective sheath SH is first completely closed, and must be made permeable to a hardening agent either slightly before the installing operation or during the installing operation. When utilizing a mixture of sand and cement as the filling compound HM, the addition of the hardening agent can be achieved in a very simple manner by making the protective sheath permeable to water. An example of an arrangement with which this is possible is shown in FIG. 2. Here two wheels or rolls ZR1 and ZR2 are provided at the circumference with radially disposed tines, prongs or projections. The cable is drawn directly through this arrangement before being fed to the laying apparatus and the pointed tines penetrate the protective sheath thus making it water permeable. When the cable is laid in an appropriate moist environment or when water is itself added during the laying operation, this cement and sand mixture situated inside the perforated sheath will begin to set up and the inner cable KA is surrounded in a short time by a pipe shaped cement sheath which forms a secure protection against animal gnawing.

Instead of the mixture consisting of sand and cement, other substances can also be utilized. These substances first exhibit a soft consistency, which can be converted into a very hard outer layer by means of a hardening agent which is added during the installation of the cable. Particularly suited for example are epoxy or polyester resins, which are mixed with a short glass fiber pieces, which pieces are avoided by many rodents or gnawing animals.

When a protective tube, for example, a concrete tube is attained in a manner discussed hereinabove, it is expedient that it is separated from the synthetic cable jacket MA of the cable KA by a gap or space. This can be achieved when unpolar synthetics for examples polyethylene are employed as the material for the cable jacket MA. Another possibility consists in providing spacing plies in the form, for example, of separate films on the outside surface of the jacket MA which plies can be applied either longitudinally or spun as a cover.

A correspondingly thick weave of material or fleece can also be applied to the outer surface of the jacket MA and is embedded with the hardenable material. This fleece with the hardenable material will be shaped into a solid tubular structure when the hardening agent has been added. The fleece or weave has a task of retaining the hardenable material until the operation of the setting has been concluded.

Instead of the solution for the preparation of the protecting sheath SH illustrated in FIG. 2, one can also precede in such a manner that the protective sheath SH is cut in its apex area. Water is then introduced into the longitudinal slots, which have occurred.

Figure 3:
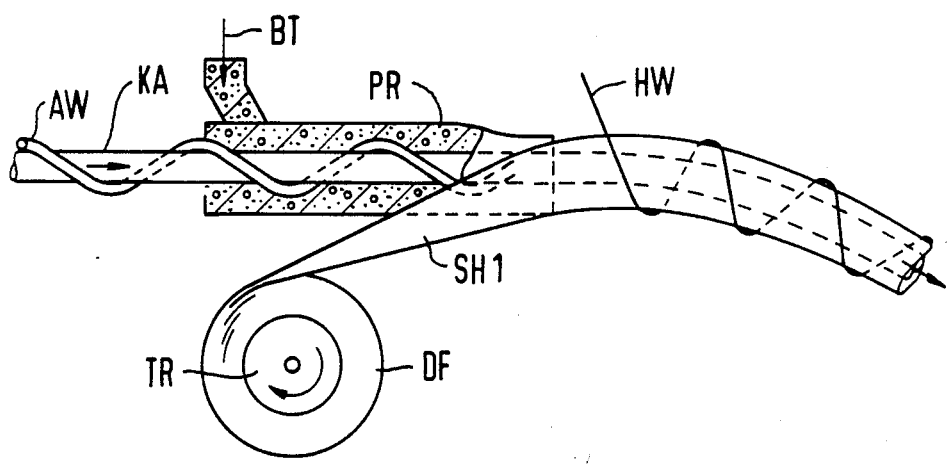
FIG. 3 is a schematic illustration of a device for continually supplying a hardenable substance to the outer jacket of the cable.

In cases in which it is undesirable to previously provide the cable with the layer hardenable material HM and the protective sheath SH, one can proceed in such a manner as schematically shown in FIG. 3. The cable KA as illustrated is surrounded by a correspondingly thick spacing helix AW. This spacing helix has the object of later guaranteeing that the layer of hardenable material HM is disposed everywhere at a sufficiently large spacing from the cable KA. During installing or laying of the cable, the outer surface of the cable jacket MA has a premix of unhardened or soft cement BT pressed onto it. Suitable means are provided to guarantee that the cement does not fall off of the cable until the final installation is completed.

As schematically indicated in FIG. 3, a doubled foil DF, which was folded in v-shaped can be continuously withdrawn from a drum TR and unfolded in such a manner that an approximate u-shaped channel SH1 occurs. A soft cement is pressed into this channel SH1 through a pressed piece or extrusion die PR so that the cable KA together with the spacing helix AW passes through the pressed piece or die PR and is surrounded on all sides with soft cement. The opened doubled foil DF in the form of the U-shaped channel SH1 will be similar to the protective sheath SH in FIG. 1 and secures the applied cement jacket in its position around the cable KA. It is assumed in the present example that a shaping tool for example an approximately wedge-shaped projection is provided at the lower side of the pressed piece or die PR which guarantees the unfolding and opening of the u-shaped double foil so that the channel shaped protective sheath SH1 is formed therefrom. This channel shaped protective sheath SH1 can be surrounded by additionally supplied retaining helix HW to close the sheath to surround the cement jacket.

It is also possible to wind or spin synthetic foils, paper or woven tapes on the soft cement jacket at the outlet of the pressed piece or die PR in order to thereby secure the finished concrete jacket emerging at the end face in its position to surround the cable. These tapes, papers and foils will retain the concrete jacket until it has set.

The cable is expediently installed such as by laying it in the ground by utilizing a device which plows or inserts the cable into the ground with the assistance of a special, short guidance tube or a guidance rail so that the hardening then occurs after laying in the ground.

Figure 4:
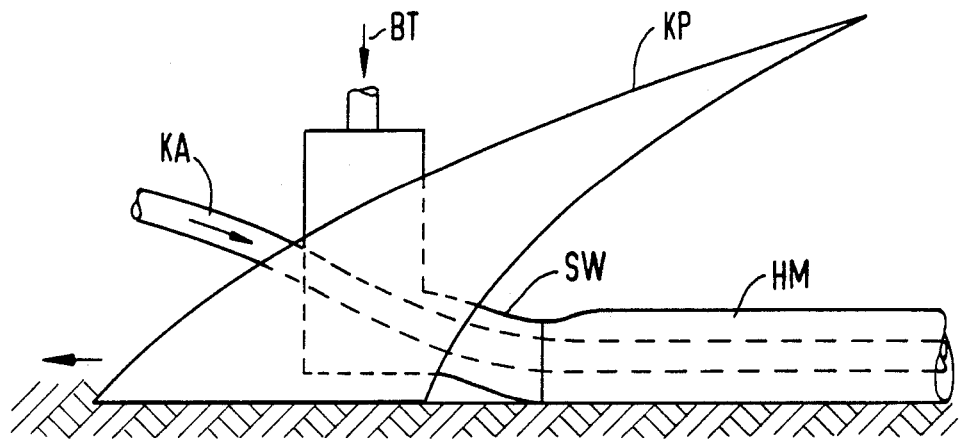
FIG. 4 is a schematic illustration of a device for surrounding a cable with a hardening material during the laying or installing operation.

A schematic illustration of FIG. 4 shows a further possibility of how the layer of hardenable material in the form of, for example, soft concrete can be applied to the surface of the cable KA during the laying or installing operation. It is thereby assumed that the cable KA is introduced into the ground by means of a plowing mechanism KP. The concrete pump or extruder is provided in the area of the cable plow KP and with the extruder the soft concrete is pressed through a special injection molding die SW. The concrete pump is integrated or is part of the cable plow to form a unit so that the laying and covering operation can be carried out in one wrok step during the longitudinal movement of the plow. The concrete BT supplied under pressure emerges through the back open end of an injection molding die SW and surrounds the cable KA passing through the die with a corresponding thick tubular shell of concrete. It can be guaranteed by means of a corresponding spacing helix or distancing pieces such as utilized in the arrangement of FIG. 3 that the cable KA retains its position in the soft concrete which has been extruded thereon. Thus the extruded concrete will surround the cable on all sides with a sufficient layer thickness to form a desired concrete sheath.

Figure 5:
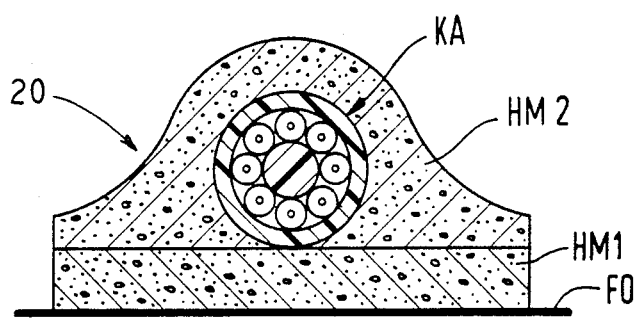
FIG. 5 is a cross-sectional view of a cable which has been surrounded by a hardenable material in accordance with the present invention.

Another type of encapsulated cable is indicated at 20 in FIG. 5. In installing the encapusulated cable 20, a first layer HM1 of a hardenable material is applied to a foil FO and placed in the bottom of cable trench. A cable KA which includes a cable jacket surrounding a plurality of cable parts or elements is layed out on this bed and the cable is subsequently enclosed and encapsulated on all sides by means of a second layer HM2 consisting of a hardenable material. Here the layer thickness of the hardenable material as in the other sample embodiments should amount to at least 10 mm.

Although various minor modifications may be suggested by those versed in the art, it should be understood that we wish to embody within the scope of the patent warranted hereon, all such modifications as reasonably and properly come within the scope of our contribution to the art.

We claim:

1. A cable comprising a cable jacket surrounding parts of the cable and means being additionally provided on the outside of the cable jacket to prevent animal gnawing, said means including a layer of resistant, hardenable material, said material only hardening when treated with a hardening agent while installing the cable, said material comprising concrete which is hardened subsequent to the cable installing operation.

2. A cable according to claim 1, which include means for mechanically retaining the layer of material until hardening, said means for retaining including a protective sheath.

3. A cable according to claim 2, wherein the protective sheath consists of a flexible hose.

4. A cable according to claim 2, which includes means for spacing the protective sheath from the outer surface of the cable jacket including inserts applied between the outer surface of the cable jacket and said inside surface of the sheath.

5. A cable according to claim 2, wherein the protective sheath has a wall thickness and stability so that it can be easily opened and perforated during an installing process.

6. A cable according to claim 1, wherein the layer of hardenable material is placed a certain distance from the outer surface of the cable jacket while in a solid state.

7. A cable according to claim 6, wherein the cable jacket is formed of unpolar synthetic plastic.

8. A cable according to claim 6, wherein additional spacing plies are disposed between the outside surface of the cable jacket and the layer of hardenable material.

9. A cable according to claim 1, wherein the layer of concrete is disposed on the outer surface of the cable jacket as a dry-mix, said cable including a protective sheath surrounding the layer of dry mix for retaining the layer of dry mix of concrete and protecting it against access of water for setting until the installing operation.

10. A cable, according to claim 1, wherein a wet mix concrete is utilized as the layer of hardenable material.

11. A cable according to claim 1, which includes means for retaining the layer of hardenable material around the jacket including a thick layer of material impregnated with hardenable material.

12. A device for installing a cable having a cable jacket surrounding cable parts and having a layer of hardenable material surrounding the cable jacket, said device including a cable plow being provided with a molding die for continuously coating the cable jacket passing through the die during a laying operation with a layer of soft hardenable material while in a soft state and means for feeding the cable through said die of the plow.

13. A device according to claim 12, wherein the means for feeding the cable having a jacket include means for surrounding the hardenable material in a soft state with a protective sheath.

14. A method for producing a cable having a cable jacket surrounded by a layer of material that is resistant to animal gnawing, said method comprising the steps of supplying a cable having a cable jacket surrounding the cable parts; applying a layer of hardenable material while in a soft state to surround the cable jacket, said step of applying including providing a water impermeable sheath to loosely surround the cable jacket and inserting a dry sand and cement mixture between the water impermeable sheath and the cable jacket; installing the cable; and hardening the layer of material surrounding the cable jacket into a solid state after completing installing of the cable, said step of hardening including producing openings in the protective sheath approximately at the time of installing to make it water permeable.

15. A method according to claim 14, wherein the step of producing openings comprises perforating said sheath.

16. A method for producing a cable having a cable jacket surrounded by a layer of material that is resistant to animal gnawing, said method comprising the steps of supplying a cable having a cable jacket surrounding the cable parts, spreading a first layer of hardenable material while in a soft state in a cable trench, installing the cable by laying the cable on the first layer and then applying a second layer of hardenable material while in a soft state to coact with the first layer to surround the cable jacket, and then allowing the first and second layers to harden into a solid state after completion of the installation of the cable.

* * * * *